(12) United States Patent
Kim et al.

(10) Patent No.: US 8,743,092 B2
(45) Date of Patent: Jun. 3, 2014

(54) DISPLAY APPARATUS THAT DETERMINES A POINTING POSITION OF A POINTING DEVICE AND METHOD THEREOF

(75) Inventors: Hyung-rae Kim, Seoul (KR); Jae-sung Park, Seoul (KR); Jung-jin Park, Seongnam-si (KR); Jun-ho Sung, Seoul (KR); Tae-hyeun Ha, Suwon-si (KR); Rustam Abdulaev, Cambridgeshire (GB)

(73) Assignee: Samsung Electronics Co., Ltd., Suwon-Si (KR)

( * ) Notice: Subject to any disclaimer, the term of this patent is extended or adjusted under 35 U.S.C. 154(b) by 546 days.

(21) Appl. No.: 12/691,118

(22) Filed: Jan. 21, 2010

(65) Prior Publication Data

US 2010/0309120 A1    Dec. 9, 2010

(30) Foreign Application Priority Data

Jun. 4, 2009    (KR) .................. 10-2009-0049542

(51) Int. Cl.
*G06F 3/033*    (2013.01)
(52) U.S. Cl.
USPC .......................................................... 345/179
(58) Field of Classification Search
USPC .................................................. 345/173–184
See application file for complete search history.

(56) References Cited

U.S. PATENT DOCUMENTS

| 3,737,655 | A | 6/1973 | Blendinger et al. | |
|---|---|---|---|---|
| 6,377,249 | B1 * | 4/2002 | Mumford | 345/179 |
| 6,633,282 | B1 * | 10/2003 | Monroe | 345/179 |
| 7,259,754 | B2 * | 8/2007 | Sasaki et al. | 345/179 |
| 2006/0267948 | A1 * | 11/2006 | Takahashi | 345/168 |

FOREIGN PATENT DOCUMENTS

JP    7-200144 A    8/1995

OTHER PUBLICATIONS

Extended European Search Report dated Jul. 14, 2010 issued in counterpart application No. 10154160.5.

* cited by examiner

*Primary Examiner* — Ryan A Lubit
(74) *Attorney, Agent, or Firm* — Sughrue Mion, PLLC (57) ABSTRACT

A display apparatus includes a display panel which include a plurality of areas; a communication unit which receive information about brightness sensed by a pointing device; a backlight unit which includes a plurality of light sources; and a controller which controls the backlight unit to change the brightness of the plural areas by a predetermined unit, and determines a pointing position of the pointing device on the basis of relative variation in the information about the brightness. With this, it is possible to detect a pointing position of a pointing device in a display apparatus having a hold-type display panel.

24 Claims, 10 Drawing Sheets

DISPLAY APPARATUS THAT DETERMINES A POINTING POSITION OF A POINTING DEVICE AND METHOD THEREOF

CROSS-REFERENCE TO RELATED APPLICATION

This application claims priority from Korean Patent Application No. 10-2009-0049542, filed on Jun. 4, 2009 in the Korean Intellectual Property Office, the disclosure of which is incorporated herein by reference.

BACKGROUND OF INVENTION

1. Field of Invention

Apparatuses and methods consistent with the present invention relate to a display apparatus and method, and more particularly, to a display apparatus having a hold-type display panel, which can detect a pointing position of a pointing device, and a display method thereof.

2. Description of the Related Art

A user may use a pointing device to input information to a display apparatus. A conventional display apparatus is based on a cathode ray tube (CRT) employing a scanning type display method. Thus, the display apparatus lights up pixels constituting an image frame in scanning sequence and senses time taken in lighting up each pixel to thereby determine a pointing position of a pointing device.

However, the scanning type display method has recently been replaced by a hold type display method. Accordingly, there is needed a method for detecting a pointing position, which can be applied to a display apparatus employing the hold type display method.

SUMMARY OF THE INVENTION

Accordingly, an aspect of the present invention is to provide a display apparatus having a hold-type display panel, which can detect a pointing position of a pointing device, and a display method thereof.

The foregoing and/or other aspects of the present invention can be achieved by providing a display apparatus including: a display panel which include a plurality of areas; a communication unit which receive information about brightness sensed by a pointing device; a backlight unit which includes a plurality of light sources; and a controller which controls the backlight unit to change the brightness of the plural areas by a predetermined unit, and determines a pointing position of the pointing device on the basis of relative variation in the information about the brightness.

The predetermined unit may include at least one among a unit of a line, a unit of a column, a unit of an individual area corresponding to the light source, a unit of an area corresponding to a predetermined number of adjacent light sources with respect to the line or the column, and a unit of a block. The controller may control the backlight unit to turn on/off the light source to vary in the brightness of the plural areas. The controller may determine an area, where the relative variation in the information about the brightness is the largest, as the pointing position. The controller may determine an area, where the information about the brightness is most decreased, as the pointing position. The controller may select at least three neighboring areas adjacent to the area where the relative variation in the information about the brightness is the largest, and use the selected neighboring areas in detecting a certain position. The controller may sequentially controls the selected neighboring areas to vary in brightness, draw circles around the centers of the selected neighboring areas by setting the radii of the circles to be shorter as the relative variation in the information about the brightness becomes larger, and detect a certain position where the circles intersect with one another. The controller may sequentially controls the plurality of areas to vary in brightness by a unit of a line to detect a certain line having the largest relative variation in the information about the brightness, and sequentially control the brightness of the certain line to vary in brightness by a unit of a column to detect a certain column having the largest relative variation in the information about the brightness. The backlight unit may operate by a local dimming method. The pointing device may be placed at a predetermined distance from the display apparatus.

Another aspect of the present invention can be achieved by providing a display method including: controlling a plurality of areas provided in a display panel to vary in brightness by a predetermined unit through a backlight unit including a plurality of light sources; receiving information about brightness sensed by a pointing device; and determining a pointing position of the pointing device on the basis of relative variation in the information about the brightness.

The predetermined unit may include at least one among a unit of a line, a unit of a column, a unit of an individual area corresponding to the light source, a unit of an area corresponding to a predetermined number of adjacent light sources with respect to the line or the column, and a unit of a block. The plural areas may be varied in brightness by turning on/off the plurality of light sources provided in the backlight unit. An area where the relative variation in the information about the brightness is the largest may be determined as the pointing position. An area where the information about the brightness is most decreased may be determined as the pointing position. At least three neighboring areas adjacent to the area having the largest relative variation in the information about the brightness may be selected, and the selected neighboring areas may be used in detecting a certain position. The selected neighboring areas may be sequentially controlled to vary in brightness, circles around the centers of the selected neighboring areas may be drawn by setting the radii of the circles to be shorter as the relative variation in the information about the brightness becomes larger, and a certain position where the circles intersect with one another may be detected. The plurality of areas may be sequentially controlled to vary in brightness by a unit of a line to detect a certain line having the largest relative variation in the information about the brightness, and the brightness of the certain line may be sequentially controlled to vary in brightness by a unit of a column to detect a certain column having the largest relative variation in the information about the brightness.

Still another aspect of the present invention can be achieved by providing a display system including: a display apparatus including a display panel which include a plurality of areas, a communication unit which receive information about brightness sensed by a pointing device; a backlight unit which includes a plurality of light sources, and a controller which controls the backlight unit to change the brightness of the plural areas by a predetermined unit and determines a pointing position of the pointing device on the basis of relative variation in the information about the brightness; and the pointing device sensing the brightness of the display panel as a user performs pointing on the display panel and transmitting the information about the sensed brightness to the display apparatus.

The display apparatus may determine a first area, where the information about the brightness is most decreased, as a pointing position. The display apparatus may select at least three neighboring areas adjacent to the first area and determine a position, where circles around the centers of the neighboring areas intersect with one another, as the pointing position, the radii of which are determined depending on the information about the brightness of the neighboring areas. The predetermined unit may include at least one among a unit of a line, a unit of a column, a unit of an individual area corresponding to the light source, a unit of an area corresponding to a predetermined number of adjacent light sources with respect to the line or the column, and a unit of a block. The pointing device may be synchronized with the display apparatus, sense the brightness whenever the brightness of the plural areas is changed by the predetermined unit, and periodically transmit the information about the sensed brightness to the display apparatus. The display apparatus may control the backlight unit so that the brightness change of the plural areas can be performed within one video frame or a video frame section where a predetermined image is invariably maintained.

In another exemplary embodiment, there is a display apparatus including: a display panel which comprises a plurality of areas; a wireless communication unit which receives information about brightness sensed by a pointing device; a backlight unit which comprises a plurality of light sources; and a controller which controls a brightness of one of the plurality of areas, wherein the controlled brightness of one of the plurality of areas is sensed by the pointing device and is used to determine a location on the display panel where the pointing device is pointed to.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY
EMBODIMENTS OF THE INVENTION

Below, embodiments of the present invention will be described in detail with reference to accompanying drawings so as to be easily realized by a person having ordinary knowledge in the art. The present invention may be embodied in various forms without being limited to the embodiments set forth herein. Descriptions of unrelated parts are omitted for clarity, and like reference numerals refer to like elements throughout. Expression such as "at least one of," when preceding a list of elements, modifies the entire list of elements and does not modify each element of the list.

Referring to the accompanying drawings, exemplary embodiments of the present invention are as follows.

Figure 1:
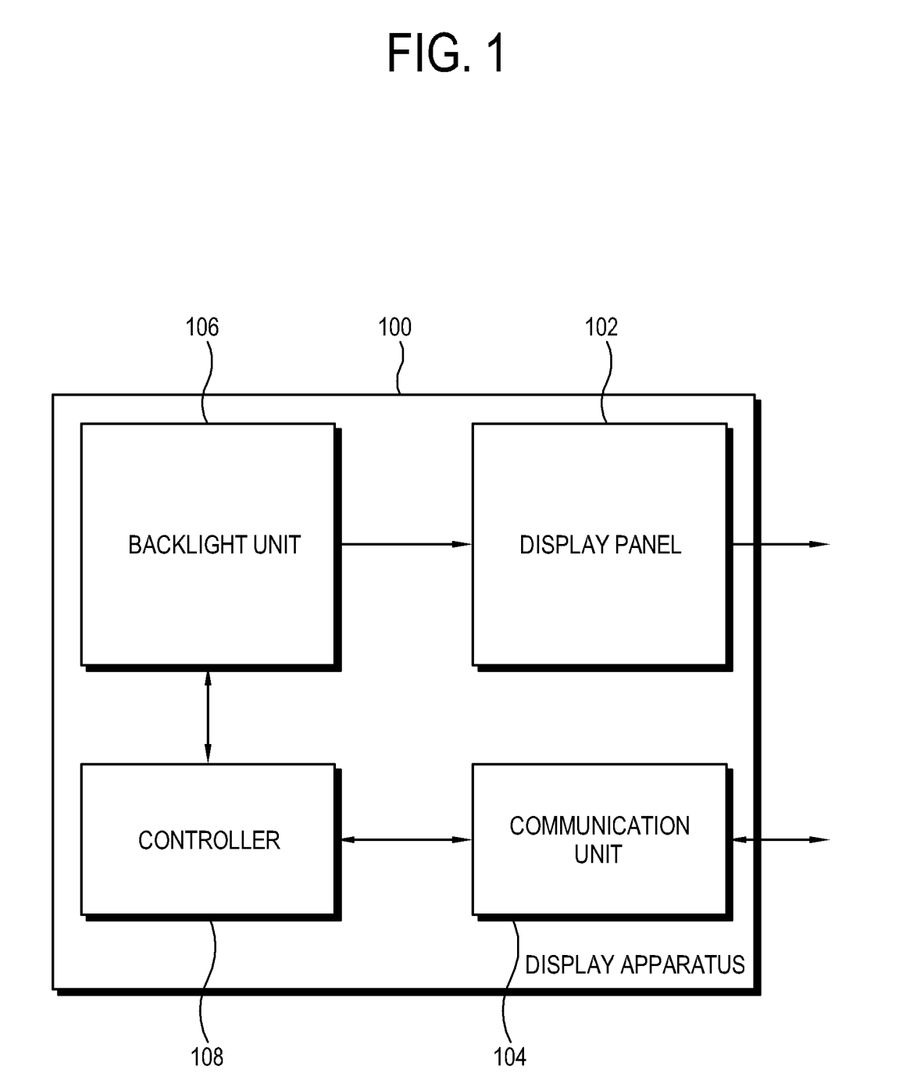
FIG. 1 shows a configuration of a display apparatus according to an exemplary embodiment of the present invention.

FIG. 1 shows a configuration of a display apparatus according to an exemplary embodiment of the present invention.

A display apparatus 100 in this exemplary embodiment may include a digital television, a desktop computer, a notebook computer, a monitor, a mobile terminal, etc. Further, the display apparatus 100 in this exemplary embodiment may include any electronic device as long as it includes a hold-type display panel and drives the display panel according to partial areas.

The display apparatus 100 in this exemplary embodiment includes a display panel 102, a communication unit 104, a backlight unit 106 and a controller 108.

The display panel 102 includes a plurality of areas. In this case, the plurality of areas may divide the display panel 102 in the form of a lattice.

The display panel 102 displays an image and may be achieved by a liquid crystal display (LCD), an organic light emitting diode (OLED), a plasma display panel (PDP), a passive display apparatus, etc.

The display panel 102 may receive information from the pointing device.

The communication unit 104 may receive information about brightness sensed by the pointing device. To this end, the communication unit 104 may communicate with the pointing device through Bluetooth, local area network (LAN), etc.

The backlight unit 106 may change the brightness of plurality areas by a predetermined unit under control of the controller 108. To this end, the backlight unit 106 may include a plurality of light sources which are driven independently of one another. Alternatively, the plurality of light sources may be driven according to groups, each group including a predetermined number of light sources.

In this exemplary embodiment, the backlight unit 106 may increase or decrease power applied to the plurality of light sources to thereby change the brightness of the plurality of areas. Also, the backlight unit 106 may turn on or off the plurality of light sources to change the brightness of the plurality of areas.

The predetermined unit may include at least one unit of a line, a column and a block.

If the predetermined unit corresponds to a unit of a line, the backlight unit 106 may change the brightness of the plurality of areas by the unit of the line. Specifically, the backlight unit 106 may instantly increase or decrease power applied to each line. Further, the backlight unit 106 may immediately turn off and then on again each line. The backlight unit 106 repeats such an operation from the first line to the last line in sequence.

If the predetermined unit corresponds to a unit of a column, the backlight unit 106 may change the brightness of the plurality of areas by the unit of the column. Specifically, the backlight unit 106 may instantly increase or decrease power applied to each column. Further, the backlight unit 106 may immediately turn off and then on again each column. The backlight unit 106 repeats such an operation from the first column to the last column in sequence.

If the predetermined unit corresponds to a unit of a block, the backlight unit 106 may change the brightness of the plurality of areas by the unit of the block. Specifically, the backlight unit 106 may instantly increase or decrease power applied to each block. Further, the backlight unit 106 may immediately turn off and then on again each block. The backlight unit 106 repeats such an operation according to general scanning order of image, that is, from the leftmost top block to the rightmost bottom block in sequence.

Meanwhile, the backlight unit 106 may be driven by a local dimming method.

The controller 108 controls the backlight unit 106 to change the brightness of the plurality of areas by a predetermined unit, and determines the pointing position of the pointing device on the basis of a relative variation in information about brightness sensed by the pointing device.

Specifically, the controller 108 may control the backlight unit 106 to increase or decrease the power applied to the plurality of light sources, thereby changing the brightness of the plurality of areas. Also, the controller 108 may control the backlight unit 106 to turn on or off the plural light sources, thereby changing the brightness of the plurality of areas.

Further, the controller 108 may control the backlight unit 106 so that the change the brightness of the plurality of areas can be performed within one video frame or a video frame section where a predetermined image is invariably maintained.

The controller 108 may determine an area, where the relative variation in information about brightness is the largest, as the pointing position. Specifically, the controller 108 may determine an area, where the information about the brightness is most decreased, as the pointing position.

Meanwhile, a scanning method and order for detecting the pointing position of the pointing device may be set variously.

According to an exemplary embodiment, the controller 108 sequentially controls the plurality of areas to be varied in brightness by the unit of the line, and detects a certain line where the relative variation in information about brightness is the largest. Then, the controller 108 sequentially controls the certain line to be varied in brightness by the unit of the column, thereby detecting a certain column where the relative variation in information about brightness is the largest.

According to another exemplary embodiment, the controller 108 sequentially controls the plurality of areas to be varied in brightness by the unit of the column, and detects a certain column where the relative variation in information about brightness is the largest. Then, the controller 108 sequentially controls the certain column to be varied in brightness by the unit of the line, thereby detecting a certain line where the relative variation in information about brightness is the largest.

According to still another exemplary embodiment, the controller 108 sequentially controls the plurality of areas to be varied in brightness by the unit of the block, and detects a certain block where the relative variation in information about brightness is the largest.

However, the foregoing exemplary embodiments are nothing but examples. There may be various orders and methods for scanning the plurality of areas to detect the pointing position of the pointing device.

In the meantime, the controller 108 may select at least three areas adjacent to the area where the relative variation in information about brightness is the largest, and thus detect the certain position. Specifically, the controller 108 sequentially controls the selected neighboring areas to be varied in brightness, and draws circles around the respective centers of the selected neighboring areas, each radius of which is set to be shorter as the relative variation in information about brightness becomes greater, thereby detecting a certain position at which the circles intersect. The more the neighboring areas are selected, the more the detected position approximates to the actual pointing position of the pointing device.

In this case, the controller 108 may select at least three neighboring areas not placed in one line or column.

Figure 2:
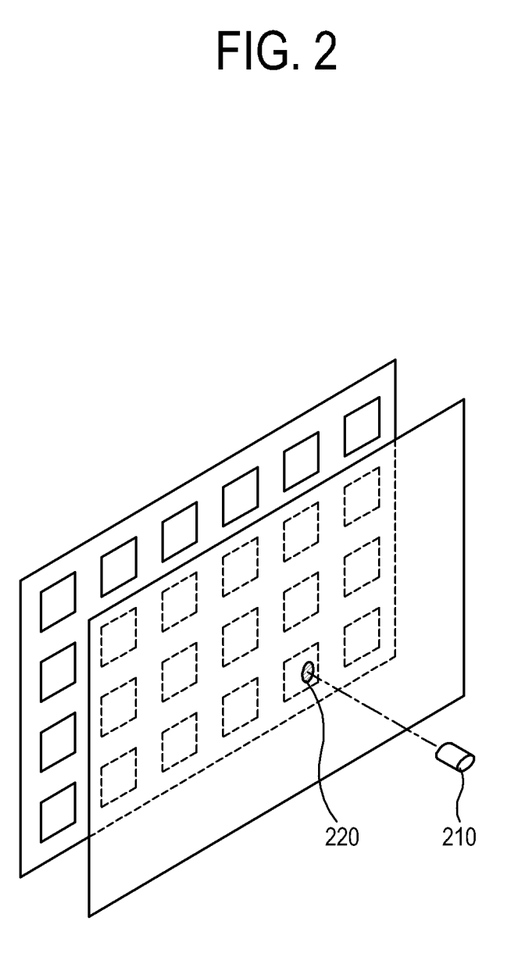
FIG. 2 shows a pointing position of a pointing device in the display apparatus according to an exemplary embodiment of the present invention.

FIG. 2 shows a pointing position of a pointing device in the display apparatus according to an exemplary embodiment of the present invention.

A pointing device 210 may include a light pen or the like. Further, any device can be used as the pointing device 210 as long as it can point out a certain position on the display apparatus and sense light.

The pointing device 210 may input information to the display apparatus. To input information, the pointing device 210 may touch the display apparatus or be placed at a predetermined distance from the display apparatus.

The pointing device 210 may sense the brightness of the position where the information is input, i.e., a pointing position 220. Specifically, the pointing device 210 senses the brightness of the pointing position 220 at a moment the display apparatus changes the brightness of the first line, senses the brightness of the pointing position 220 at a moment the display apparatus changes the brightness of the second line, . . . , and senses the brightness of the pointing position 220 at a moment the display apparatus changes the brightness of the Nth line.

To this end, the pointing device 210 may include an optical sensor for sensing light.

Meanwhile, the pointing device 210 may communicate with the display apparatus to transmit information about the sensed brightness to the display apparatus. According to an exemplary embodiment, the pointing device 210 may be synchronized with the display apparatus and sense the brightness whenever the brightness of the plurality of areas included in the display panel is changed by a predetermined unit, thereby periodically transmitting information about the sensed brightness to the display apparatus.

Figure 3A:
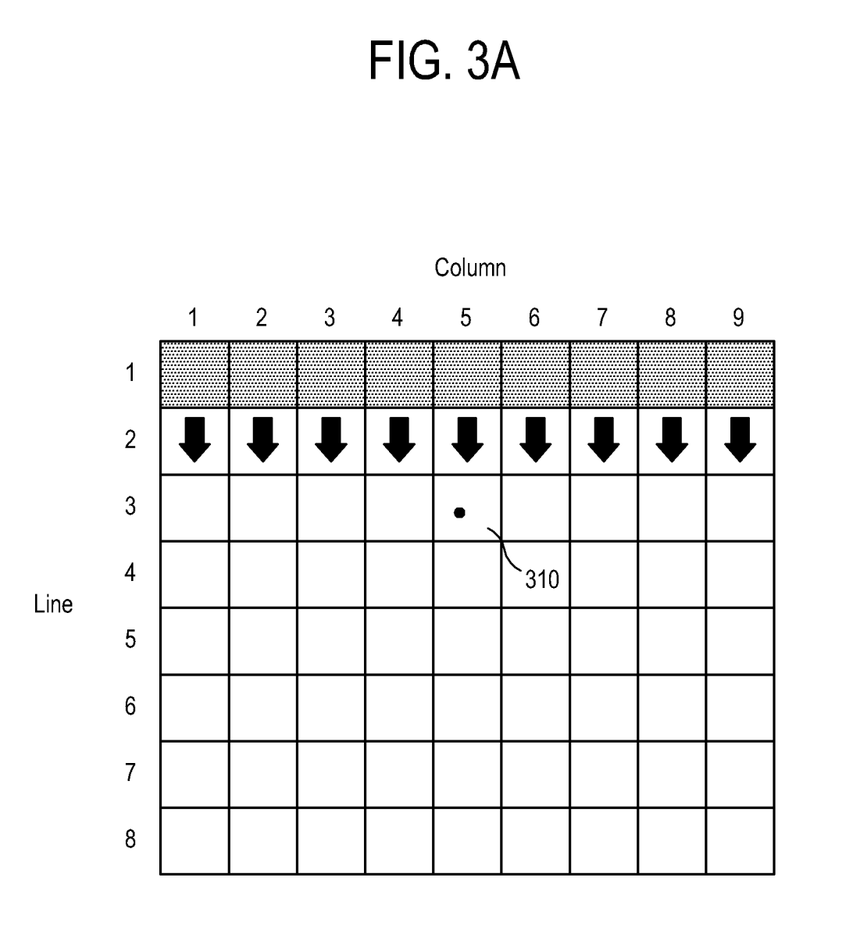
FIGS. 3A to 3B show a procedure of detecting a certain line having the largest relative variation in information about brightness according to an exemplary embodiment of the present invention.
Figure 3B:
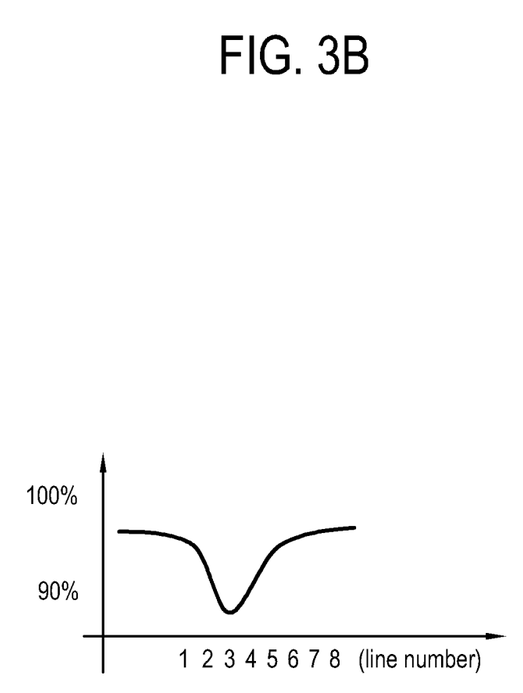

FIGS. 3A to 3B show a procedure of detecting a certain line having the largest relative variation in information about brightness according to an exemplary embodiment of the present invention.

Referring to FIG. 3A, the current pointing position of the pointing device is placed within an area 310 existing on 3rd line and 5th column.

The pointing device can sense the brightness of the pointing position. The line having the greatest effect on the brightness of the pointing position is the line where the pointing position is placed. That is, if the brightness of the line where the pointing position is placed is changed, the brightness of the pointing position is most changed. Thus, it is possible to detect a certain line having the pointing position while the brightness of the display panel is changed by a unit of a line.

For this, the display apparatus can change the brightness of the plurality of areas by the unit of the line. Specifically, the display device may instantly increase or decrease the power applied to each line. Alternatively, the display apparatus instantly turns off and then on again the each line.

For instance, with FIG. 3A, assuming that each line is turned on and off to change the brightness of the plurality of areas by the unit of the line, the display apparatus instantly turns off and then on again the first line, turns off and then on again the second line, and so on. Such operations are sequentially repeated up to the last eighth line.

In this case, the pointing device senses the brightness of the pointing position at the moment when the display apparatus turns off the first line, the brightness of the pointing position at the moment when the display apparatus turns off the second line, . . . , and the brightness of the pointing position at the moment when the display apparatus turns off the eighth line. Then, the pointing device transmits the information about the sensed brightness to the display apparatus.

On the basis of the information about the brightness sensed by the pointing device, the display apparatus may determine a line, of which the relative variation in the information about the brightness is the largest, as the pointing position. In FIG. 3A, the display apparatus may determine a line, where the information about the brightness is most decreased, as the pointing position.

FIG. 3B illustrates brightness change at the pointing position when the lines of the display panel are turned off in sequence. In this case, the X-axis refers to the line of the display panel, and the Y-axis refers to the brightness change at the pointing position when the corresponding line is turned off. Referring to FIG. 3B, the pointing position has the largest brightness change when the third line is turned off. Thus, the third line has the largest relative variation in information about the brightness. In this case, the display apparatus determines that the pointing position is placed in the third line.

Figure 4A:
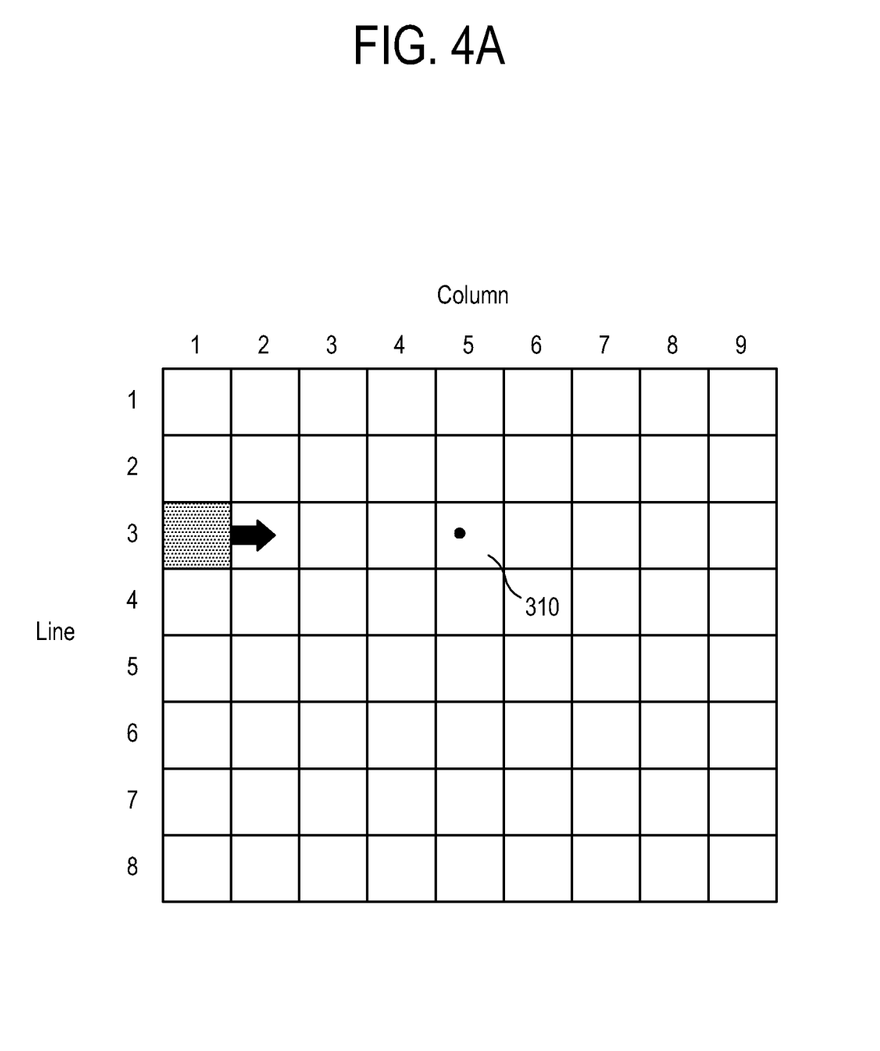
FIGS. 4A to 4B show a procedure of detecting a certain column having the largest relative variation in information about brightness according to an exemplary embodiment of the present invention.
Figure 4B:
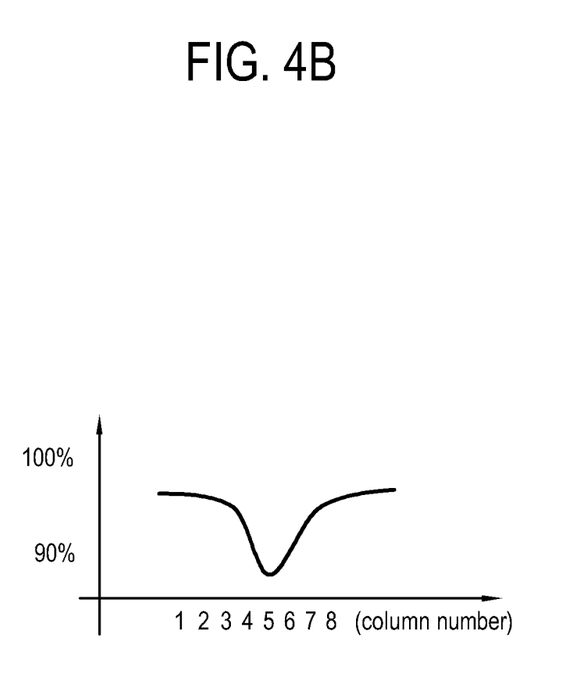

FIGS. 4A and 4B show a procedure of detecting a certain column having the largest relative variation in information about brightness according to an exemplary embodiment of the present invention.

After the line where the pointing position is placed is determined, the display apparatus determines which column on the determined line has the pointing position.

The column having the greatest effect on the brightness of the pointing position is the column where the pointing position is placed. That is, if the brightness of the column where the pointing position is placed is changed, the brightness of the pointing position is most changed. Thus, it is possible to detect a certain column having the pointing position while changing the brightness of the display panel by a unit of a column.

For this, the display apparatus can change the brightness of the plurality of areas by the unit of the column. Specifically, the display device may instantly increase or decrease the power applied to each column. Alternatively, the display apparatus instantly turns off and then on again the each column.

For instance, with FIG. 4A, assuming that each column on the certain line (detected referring to FIGS. 3A to 3B) is turned on and off to change the brightness of the plurality of areas by the unit of the column, the display apparatus instantly turns off and then on again the first column on the third line, turns off and then on again the second column on the third line, and so on. Such operations are sequentially repeated up to the last ninth column on the third line.

In this case, the pointing device senses the brightness of the pointing position at the moment when the display apparatus turns off the first column, the brightness of the pointing position at the moment when the display apparatus turns off the second column, . . . , and the brightness of the pointing position at the moment when the display apparatus turns off the ninth column. Then, the pointing device transmits the information about the sensed brightness to the display apparatus.

On the basis of the information about the brightness sensed by the pointing device, the display apparatus may determine a column, of which the relative variation in the information about the brightness is the largest, as the pointing position.

In FIG. 4A, the display apparatus may determine a column, where the information about the brightness is most decreased, as the pointing position.

FIG. 4B illustrates brightness change at the pointing position when the columns of the display panel are turned off in sequence. In this case, the X-axis refers to the column of the display panel, and the Y-axis refers to the brightness change at the pointing position when the corresponding column is turned off. Referring to FIG. 4B, the pointing position has the largest brightness change when the fifth column is turned off. Thus, the fifth column has the largest relative variation in information about the brightness. In this case, the display apparatus determines that the pointing position is placed in the fifth columns.

Figure 5A:
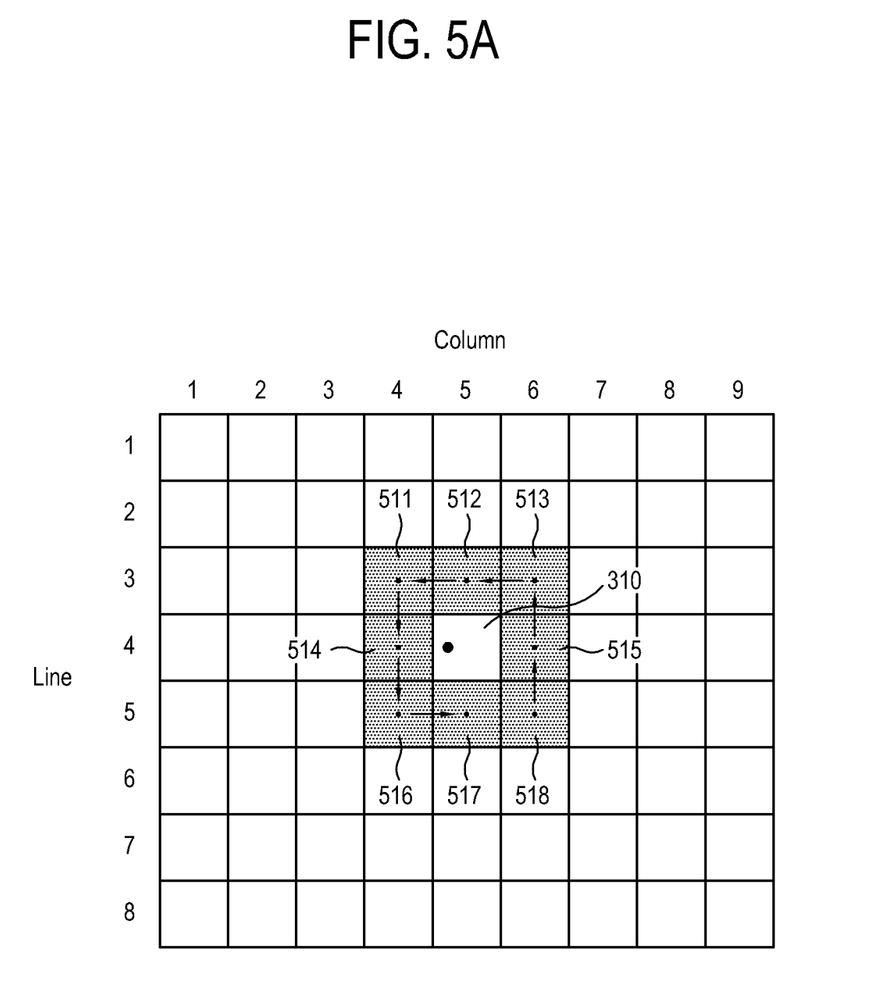
FIGS. 5A to 5B show a procedure of detecting a pointing position according to another exemplary embodiment of the present invention.
Figure 5B:
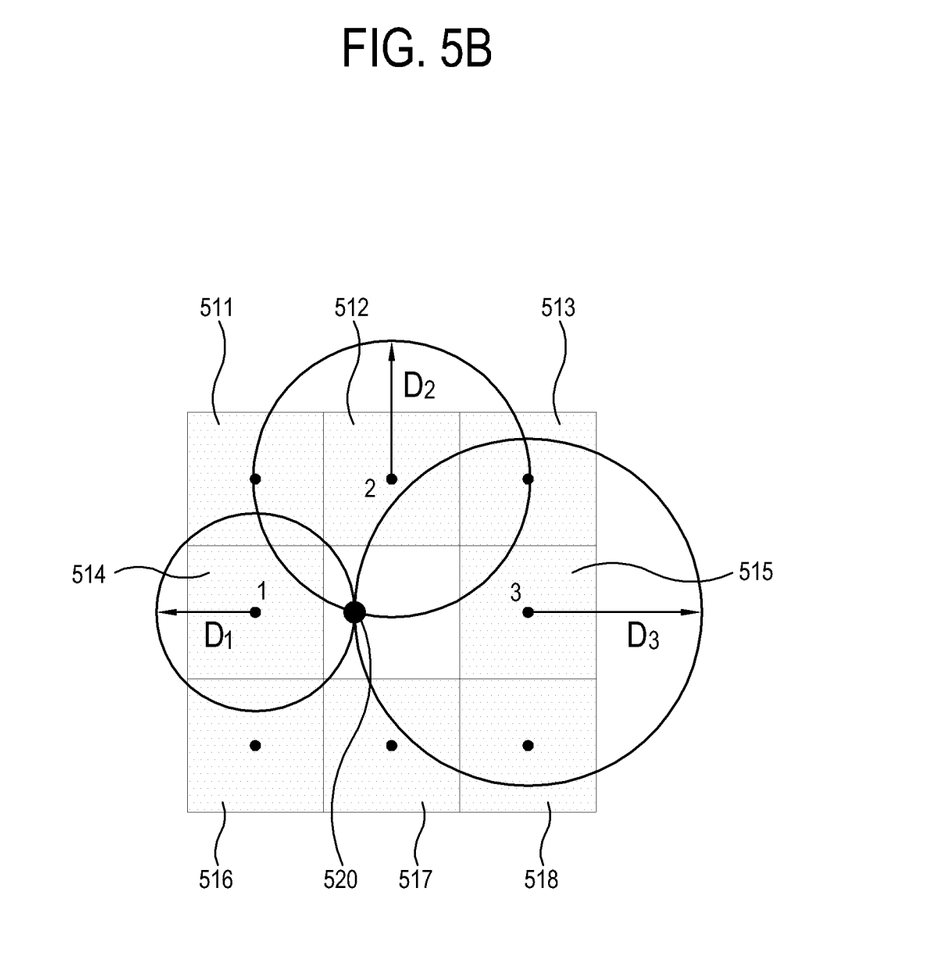

According to FIGS. 3A to 4B, the pointing position is placed within an area existing on 3rd line and 5th column. FIGS. 5A to 5B show a procedure of detecting a pointing position according to another exemplary embodiment of the present invention.

In this exemplary embodiment, after detecting an area having the largest relative variation in information about brightness, the display apparatus may select at least three areas adjacent to the area where the relative variation in information about brightness is the largest, and thus detect the certain position. Specifically, the display apparatus sequentially controls the selected neighboring areas to be varied in brightness, and draws circles around the respective centers of the selected neighboring areas, each radius of which is set to be shorter as the relative variation in information about brightness becomes greater, thereby detecting a certain position at which the circles intersect.

Referring to FIGS. 3A to 4B, if an area 310 of which the relative variation in information about brightness is the largest (hereinafter, referred to as a "center area") is determined, the display apparatus selects at least three neighboring areas among a first neighboring area 511, a second neighboring area 512, a third neighboring area 513, a fourth neighboring area 514, a fifth neighboring area 515, a sixth neighboring area 516, a seventh neighboring area 517, and an eighth neighboring area 518. In this case, as more neighboring areas are selected, the pointing position of the pointing device to be subsequently determined will become more accurate.

To detect the pointing position more accurately, the display apparatus may select at least three neighboring areas not placed in one line or column.

Referring to FIG. 5B, three neighboring areas, i.e., the second neighboring area 512, the fourth neighboring area 514 and the fifth neighboring area 515 are selected. The display apparatus controls the second neighboring area 512, the fourth neighboring area 514 and the fifth neighboring area 515 to be sequentially varied in brightness. For example, the display apparatus may turn on or off the second neighboring area 512, the fourth neighboring area 514 and the fifth neighboring area 515 in sequence. In this case, the display apparatus receives information about the brightness at the pointing position from the pointing device. Specifically, the display apparatus receives information about the brightness of the pointing position when the second neighboring area 512 is turned off, information about the brightness of the pointing position when the fourth neighboring area 514 is turned off, and information about the brightness of the pointing position when the fifth neighboring area 515 is turned off.

In general, the light source has the greater effect on a sensing position as closer to the sensing position. While the neighboring areas are turned off in sequence, the center area 310 more largely varies in brightness as distance between the neighboring areas and the center area 310 becomes shorter.

Thus, the display apparatus sets the radius of the neighboring area to be smaller as the relative variation in the brightness of the center area 310 becomes larger. If the effect on the brightness change of the center area 310 becomes greater in order of the fourth neighboring area 514, the second neighboring area 512 and the fifth neighboring area 515, the radius is as follows: the fourth neighboring area 514< the second neighboring area 512< the fifth neighboring area 515. For example, let the radii of the fourth, second and fifth neighboring areas 514, 512 and 515 be "D1," "D2," and "D3," respectively. D1<D2<D3 (refer to FIG. 5B).

In this case, the display apparatus draws circles having radii D1, D2, D3 from the centers of the fourth, second and fifth neighboring areas 514, 512 and 515, respectively, and detects a crossing position 520 where the circles are intersected. The detected crossing position 520 is the pointing position.

According to this exemplary embodiment, it is possible to detect the pointing position more accurately.

Figure 6:
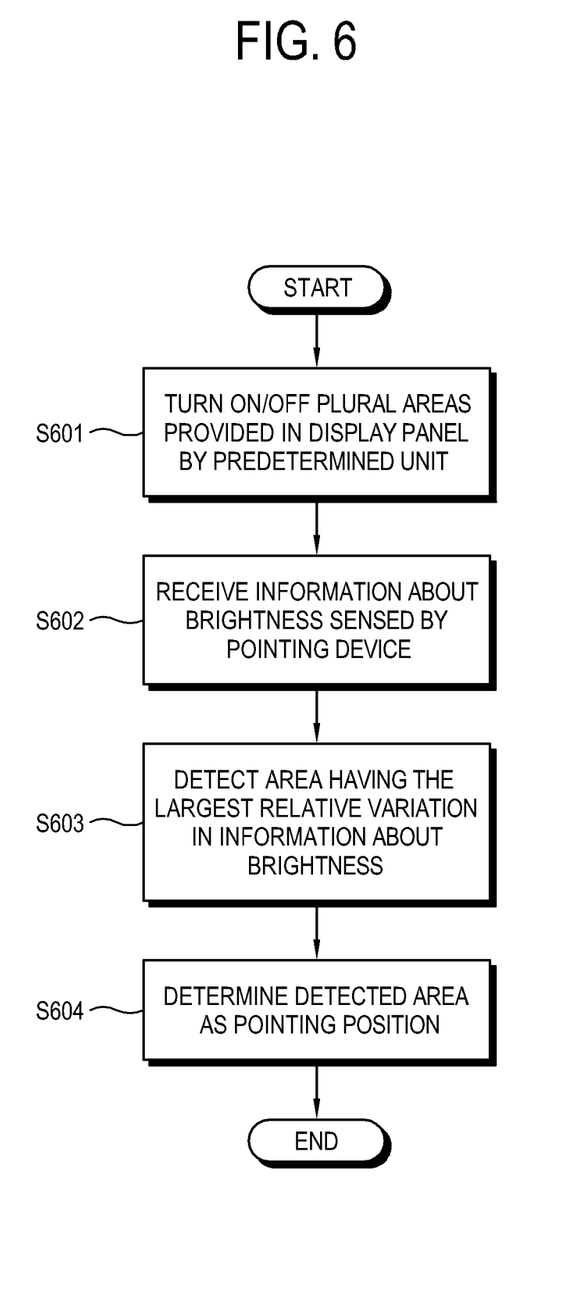
FIG. 6 is a flowchart of detecting a pointing position according to an exemplary embodiment of the present invention.

FIG. 6 is a flowchart of detecting a pointing position according to an exemplary embodiment of the present invention.

With FIG. 6, assume that the plurality areas are turned on or off to vary in brightness.

At operation S601, the display apparatus 100 turns on or off the plurality of areas provided in the display panel by a predetermined unit. At operation S602, the display apparatus 100 communicates with the pointing device to receive information about brightness sensed by the pointing device.

At operation S603, the display apparatus 100 detects an area having the largest relative variation in the information about the brightness. Then, the display apparatus 100 determines the detected area as the pointing position.

Figure 7:
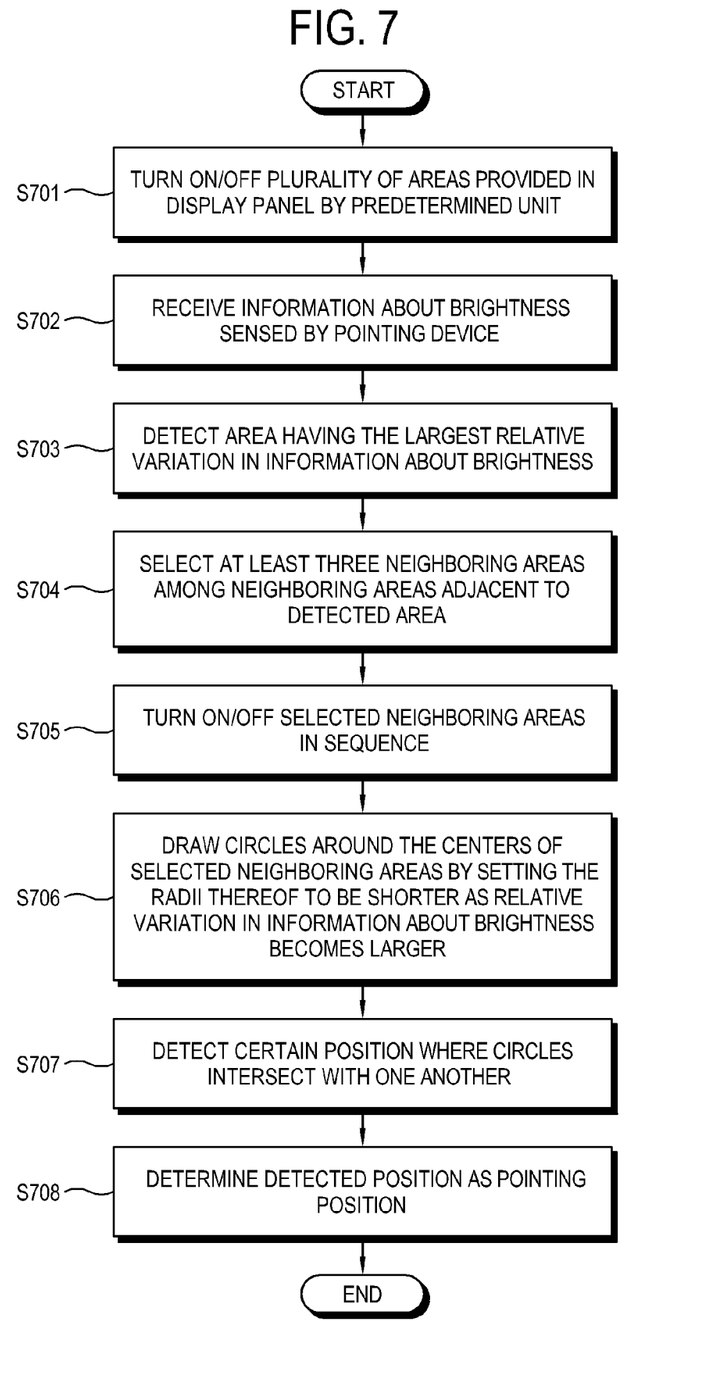
FIG. 7 is a flowchart of detecting a pointing position according to another exemplary embodiment of the present invention.

FIG. 7 is a flowchart of detecting a pointing position according to another exemplary embodiment of the present invention.

With FIG. 7, assume that the plurality areas are turned on or off to vary in brightness.

At operation S701, the display apparatus 100 turns on or off the plurality of areas provided in the display panel 102 by a predetermined unit. At operation S702, the display apparatus 100 communicates with the pointing device to receive information about brightness sensed by the pointing device.

At operation S703, the display apparatus 100 detects an area having the largest relative variation in the information about the brightness. At operation S704, the display apparatus 100 selects at least three neighboring areas among the neighboring areas adjacent to the detected area.

At operation S705, the display apparatus 100 turns on or off the selected neighboring areas in sequence. At operation S706, the display apparatus 100 draws circles around the centers of the selected neighboring areas by setting the radii thereof to be shorter as the relative variation in information about brightness becomes larger.

Then, the display apparatus 100 detects a certain position where the circles intersect with one another at operation S707, and determines the detected position as the pointing position at operation S708.

As described above, it is possible to detect a pointing position of a pointing device even in a display apparatus having a hold-type display panel.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
    a display panel which comprises a plurality of areas;
    a communication unit which receives information about brightness sensed by a pointing device;
    a backlight unit which comprises a plurality of light sources; and
    a controller which controls the backlight unit to change brightness of the plurality of areas by first predetermined units, in sequential order from a first one of the first predetermined units continuously to an nth one of the first predetermined units, wherein a total of n first predetermined units are provided on the display panel, controls the backlight unit to change the brightness of the plurality of areas by second predetermined units, in sequential order from a first one of the second predetermined units continuously to an mth one of the second predetermined units, wherein a total of m second predetermined units are provided on the display panel, and determines a pointing position of the pointing device based on relative variation in the information about the brightness of the plurality of areas,
    wherein the controller generates a circle for each of at least three neighboring areas adjacent to an anticipated pointing position based on the relative variation in the information about the brightness with regard to the brightness of the determined area, and detects the pointing position where the circles intersect with one another.

2. The display apparatus according to claim 1, wherein the first predetermined units are a unit of a line, and the second predetermined units are a unit of a column.

3. The display apparatus according to claim 1, wherein the controller controls the backlight unit to turn on or turn off a light source of the plurality of light sources to vary the brightness of the plurality of the areas in a selected one of the first and second predetermined units.

4. The display apparatus according to claim 1, wherein the controller determines one of the first and second predetermined units, respectively, where the relative variation in the information about the brightness is the largest, as the first and second predetermined units that include an area containing the pointing position.

5. The display apparatus according to claim 4, wherein the controller determines the area, where the information about the brightness is most decreased, as the area containing the pointing position.

6. The display apparatus according to claim 4, wherein the controller selects the at least three neighboring areas adjacent to the area where the relative variation in the information about the brightness is the largest.

7. The display apparatus according to claim 6, wherein the controller sequentially controls each of the at least three neighboring areas to vary in brightness,
    wherein the larger the variation in the brightness information between the determined area and the three neighboring areas, the shorter the radius of the circle of each of the at least three neighboring areas.

8. The display apparatus according to claim 1, wherein the backlight unit is driven by local dimming.

9. The display apparatus according to claim 1, wherein the pointing device is placed at a predetermined distance from the display panel.

10. A display method comprising:
    controlling a plurality of areas in a display panel to vary in brightness by first predetermined units through a backlight unit comprising a plurality of light sources, wherein the brightness is varied in sequential order from a first one of the first predetermined units continuously to an nth one of the first predetermined units, wherein a total of n first predetermined units are provided on the display panel;

controlling a plurality of the areas in the display panel to vary in brightness by second predetermined units through the backlight unit comprising the plurality of light sources, wherein the brightness is varied in sequential order from a first one of the second predetermined units continuously to an mth one of the second predetermined units, wherein a total of m first predetermined units are provided on the display panel;

receiving information about brightness sensed by a pointing device; and determining a pointing position of the pointing device based on relative variation in the information about the brightness, generating a circle for each of at least three neighboring areas adjacent to an anticipated pointing position based on the relative variation in the information about the brightness with regard to the brightness of the determined area, and detecting the pointing position where the circles intersect with one another.

11. The display method according to claim 10, wherein the first predetermined units are a unit of a line, and the second predetermined units are a unit of a column.

12. The display method according to claim 10, wherein the plurality of areas are varied in brightness by turning on or turning off the plurality of light sources provided in the backlight unit.

13. The display method according to claim 10, wherein one of the first and second predetermined units, respectively, where the relative variation in the information about the brightness is the largest, is determined as the first and second predetermined units that include an area containing the pointing position.

14. The display method according to claim 13, wherein the area where the information about the brightness is most decreased is determined as the area containing the pointing position.

15. The display method according to claim 13, wherein the at least three neighboring areas adjacent to the area having a largest relative variation in the information about the brightness are selected.

16. The display method according to claim 15, wherein the at least three neighboring areas are sequentially controlled to vary in brightness
wherein the larger the variation in the brightness information between the determined area and the three neighboring areas, the shorter the radius of the circle of each of the at least three neighboring areas.

17. A display system comprising:
a display apparatus comprising a display panel which comprises a plurality of areas, a communication unit which communicates with a pointing device; a backlight unit which includes a plurality of light sources,
wherein the display apparatus controls the backlight unit to change brightness of the plurality of areas by first predetermined units, in sequential order from a first one of the first predetermined units continuously to an nth one of the first predetermined units, wherein a total of n first predetermined units are provided on the display panel, controls the backlight unit to change the brightness of the plurality of areas by second predetermined units, in sequential order from a first one of the second predetermined units continuously to an mth one of the second predetermined units, wherein a total of m second predetermined units are provided on the display panel, and determines a pointing position of the pointing device based on relative variation in information about the brightness received from the pointing device, and the pointing device senses the brightness of the display panel as a user performs pointing at the display panel and transmits the information about the sensed brightness to the display apparatus, wherein the display apparatus generates a circle for each of at least three neighboring areas adjacent to an anticipated pointing position based on the relative variation in the information about the brightness with regard to the brightness of the determined area, and detects the pointing position where the circles intersect with one another.

18. The display system according to claim 17, wherein the display apparatus determines a first area of the plurality of areas, where the information about the brightness is most decreased, as a pointing position.

19. The display system according to claim 18, wherein radii of the circles are determined depending on where each of the circles intersects the pointing position so as to identify the pointing position.

20. The display system according to claim 17, wherein the first predetermined units are a unit of a line, and the second predetermined units are a unit of a column.

21. The display system according to claim 17, wherein the pointing device is synchronized with the display apparatus, senses the brightness whenever the brightness of the plurality of areas is changed by the first or second predetermined unit, and periodically transmits the information about the sensed brightness to the display apparatus.

22. The display system according to claim 17, wherein the display apparatus controls the backlight unit so that the brightness change of the plurality of areas can be performed within one video frame or a video frame section where a predetermined image is maintained.

23. A display apparatus comprising:
a display panel which comprises a plurality of areas;
a wireless communication unit which receives information about brightness sensed by a pointing device;
a backlight unit which comprises a plurality of light sources; and
a controller which controls a brightness of one of the plurality of areas by a predetermined unit, in sequential order from a first one of the plurality of areas continuously to an nth one of the plurality of areas, wherein a total of n areas are provided on the display panel,
wherein the controlled brightness of one of the plurality of areas is sensed by the pointing device and is used to determine a location on the display panel where the pointing device is pointed to,
wherein the controller generates a circle for each of at least three neighboring areas adjacent to an anticipated pointing position based on the relative variation in the information about the brightness with regard to the brightness of the determined area, and detects the pointing position where the circles inters with one another.

24. The display apparatus of claim 23, wherein a relative variation in brightness is used to determine the location where the pointing device is pointed to.

* * * * *